United States Patent
Benker et al.

(10) Patent No.: US 6,273,003 B1
(45) Date of Patent: Aug. 14, 2001

(54) CAMBER CONTROL FOR RAIL VEHICLES

(75) Inventors: Thomas Benker, Pegnitz; Bernd Metzner, Pinneberg, both of (DE)

(73) Assignee: ABB Daimler-Benz Transportation GmbH

( * ) Notice: Subject to any disclaimer, the term of this patent is extended or adjusted under 35 U.S.C. 154(b) by 0 days.

(21) Appl. No.: 09/355,573
(22) PCT Filed: Jan. 15, 1998
(86) PCT No.: PCT/EP98/00204
   § 371 Date: Jul. 29, 1999
   § 102(e) Date: Jul. 29, 1999
(87) PCT Pub. No.: WO98/33691
   PCT Pub. Date: Aug. 6, 1998

(30) Foreign Application Priority Data

Jan. 30, 1997 (DE) .............................. 197 03 322

(51) Int. Cl.⁷ ................. B61F 3/00; B61F 1/00
(52) U.S. Cl. ........................ 105/199.2; 105/453
(58) Field of Search ............. 105/199.1, 199.2, 105/453

(56) References Cited

U.S. PATENT DOCUMENTS 5,775,230 * 7/1998 Joos .................................. 105/199.2
5,784,969 * 7/1998 Steidl et al. ...................... 105/199.2
5,943,962 * 8/1999 Birkhahn et al. ................. 105/199.1

FOREIGN PATENT DOCUMENTS 0557893    9/1993 (EP) .
557893 B1 * 11/1996 (EP) ................................. 105/199.2

* cited by examiner

Primary Examiner—S. Joseph Morano
Assistant Examiner—Robert J. McCarry, Jr.
(74) Attorney, Agent, or Firm—Webb Ziesenheim Logsdon Orkin & Hanson, P.C.

(57) ABSTRACT

The invention relates to a tilt control for the superstructure of a rail vehicle, that includes a transversal acceleration sensor and a tilt control device controlled therefrom for tilting the superstructure along its longitudinal axis in relation to the running gear or the bogie supporting the superstructure. A low-pass filter is connected in the signal path between the transversal acceleration sensor and the tilt control device. In order to at least amply compensate the operation time of the low-pass filter, a steady state member is connected in the signal path between the transversal acceleration sensor and the low-pass filter, whose output signal is selected at least in the middle segment of a predetermined measuring value of the transversal acceleration values to be detected in such a way that the transversal acceleration in the superstructure remains almost constant in said segment.

18 Claims, 4 Drawing Sheets

CAMBER CONTROL FOR RAIL VEHICLES

BACKGROUND OF THE INVENTION

1. Field of the Invention

The invention relates to a tilt control system for the body of a rail vehicle.

2. Brief Description of the Prior Art

In a known tilt control system of this type, as disclosed in DE 37 27 768 C1, a gyroscope for the detection of the rotational speed of the vehicle body and a speed sensor are provided, in addition to a lateral acceleration sensor, to generate a control signal for the curve-dependent tilt of the body of a rail vehicle. The output signals of the lateral acceleration sensor and the angle of rotation sensor are fed to identical electrical low-pass filters with a low cutoff frequency in order to remove primary signals with superimposed parasitic oscillation from the output signals. The filtered, rotation angle-dependent output signal of the gyroscope is multiplied by a signal derived from vehicle speed and acceleration due to gravity. Together with the filtered signal of the lateral acceleration sensor, the signals are fed to a tilt control device used for tilting the vehicle body, in dependence on the input values, about its longitudinal axis, relative to a running gear or bogie assembly supporting the vehicle body. The low-pass filters have a cutoff frequency of 2 Hz. The low cutoff frequency results in an undesirable electrical time delay of the output signal. In order to compensate for this disadvantage, which would delay the tilting action of the vehicle body with adverse results for ride comfort, the output signal is filtered by the low-pass filter and, as such, determines the tilt of the vehicle body and is joined by a correction signal. The correction signal results from multiple multiplication and addition, which is calculated from the rotational speed of the vehicle body about its vertical axis and from its speed of travel. This involves much technical effort and an increased possibility of errors. In addition, the cutoff frequency of the low-pass filters is high compared to the rate of increase of the lateral acceleration.

SUMMARY OF THE INVENTION

The invention is based on the problem of providing by suitable measures a tilt control system for the body of a rail vehicle, wherein the tilt control device is controlled with minimum delay while circuit design is simplified.

In a design of a tilt control system according to the invention, only the output signal of a lateral acceleration sensor is used to control the actuator arrangement of a tilt control device, effecting the tilting of the vehicle body. This signal is fed in its original form, noisy due to parasitic oscillation, to a characteristic element without filtration. In the characteristic element, at least one characteristic is fixed, in accordance with which an output signal value allocated to a defined input signal value is output. In this context, the input signal is weighted in a way to ensure that only a medium range is used to control the tilt of the vehicle body. The characteristic element may, in particular, be constructed on a digital basis, whereby associated output signal values are stored in a memory in dependence on the magnitude of the output signal of the lateral acceleration sensor. The characteristic of the characteristic element has an unweighted initial range, in which the input signal does not result in an output signal, i.e. the lateral acceleration in the vehicle body varies with the lateral acceleration at track level. In the next range, the weighted medium range, the characteristic element is defined as any monotonically increasing function. In particular, curve sections rising linearly in stages are chosen. At least one curve section must have enough slope to keep lateral acceleration in the vehicle body constant for this curve range. This compensates at least partially for the delay of the downstream low-pass filter. From a preset upper acceleration value, the characteristic element once again supplies an unweighted, constant output signal value, independent of the input signal, so that the lateral acceleration in the travelling vehicle body once again varies with the lateral acceleration at track level, there being no further tilting of the vehicle body. The initial range detected at track level preferably extends to approximately 0.4 m/s² and the weighted medium range from approximately 0.4 to 1. 6 m/s². The output signal of the characteristic element may be either a converted lateral acceleration value or a value determining the set tilt angle of the vehicle body. This low-pass filter can have a cutoff frequency of less than 1 Hz. This cutoff frequency is preferably adjusted to approximately 0.2 Hz. Irrespective of the increased delay of the filter, the actuator arrangement reacts very fast, owing to the weighting function of the characteristic element, because the delay of the low-pass filter is at least partially compensated for. The low cutoff frequency of the low-pass filter results in a soft tilt variation at the vehicle body and a rounded characteristic transition at the beginning and end of the weighted characteristic range. By omitting any further sensors and associated filter and computing units, a simple tilt control system with excellent noise immunity is created, which can be implemented cost-effectively and with little technical effort.

The permissible lateral acceleration at track level is limited to values between 0 and 2 m/s² in the present context. The lateral acceleration in the vehicle body varies synchronously with the lateral acceleration at track level, up to approximately 0.4 m/s², while being kept constant at approximately 0.4 m/s² in the medium range by the activation of the actuators of the tilt control system, followed by a further synchronous increase to approximately 0.8 m/s² in the range above 1.6 m/s².

The control behaviour can be adapted to varying rail vehicle types by storing several optional families of characteristics in the characteristic element, which can be called up when installing the system on the rail vehicle or when a change in the tilt characteristic is desired. In a digital characteristic element, an input signal curve can be allocated its own group of memory locations with static data for each characteristic, or the data values in a group of memory locations can be changed in accordance with the required characteristic curve.

DETAILED DESCRIPTION OF THE PREFERRED EMBODIMENT

Figure 1:
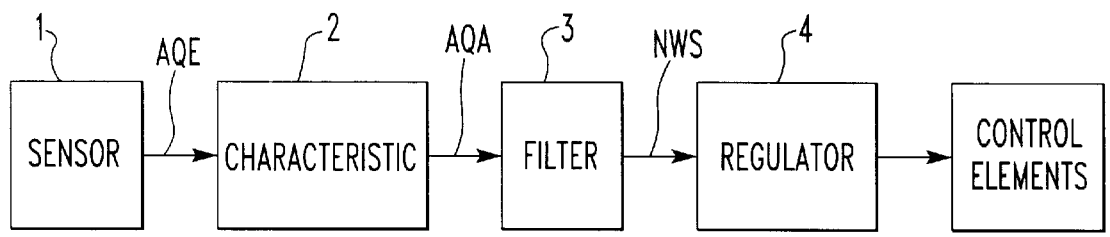
FIG. 1 is a block diagram of a tilt control device for the body of a rail vehicle.
Figure 4B:
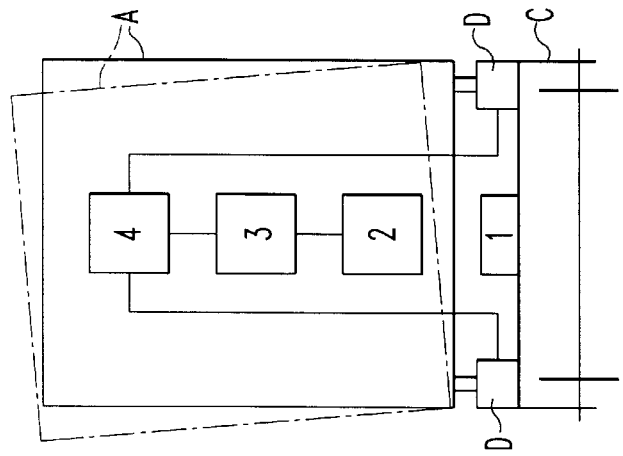
FIG 4b is a schematic illustration of a front view of a rail vehicle having a tilt control device.
Figure 4A:
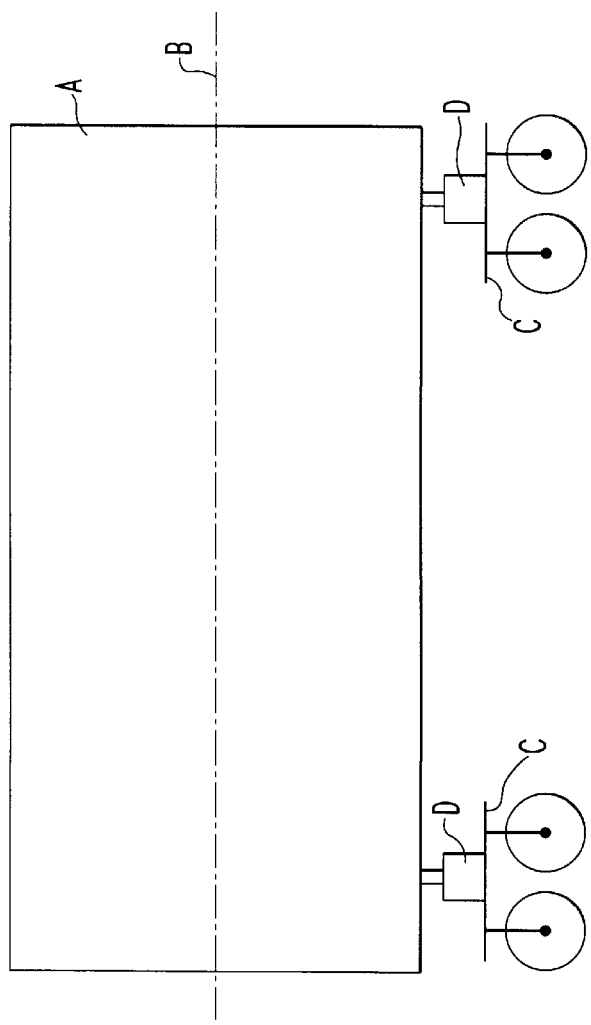
FIG 4a is a schematic illustration of a side view of a rail vehicle having a tilt control device.

Referring to FIGS. 1, 4a, and 4b, a rail vehicle to be controlled has a body A capable of being tilted about its longitudinal axis B by means of a tilt control device on at least two running gears or bogies C, controllable mechanical actuators D in the form of electromotive or hydraulic actuators being mounted between vehicle body A and running gear/bogies C. The control of the tilt of the vehicle body A is required only when negotiating a curve and comes into effect in order to ensure the comfortable operation of the rail vehicle without adversely affecting the user by excessive lateral forces. For the control of the required actuators D, a running gear/bogie C, an axle of the running gear or even a bogie frame is fitted with a sensor 1, which responds to lateral acceleration forces and generates an electrical signal in dependence of these. Owing to track faults, vibrations produced by the vehicle itself and other similar factors, the acceleration-dependent signal representing the primary set-point signal for the control of the tilt angle is affected by superimposed parasitic oscillations of a much higher frequency. This noisy signal is fed without filtration to a characteristic element 2 supplying, in dependence on the magnitude of its input signal aqe, a nonproportional output signal aqa, dependent not only on the ideal primary set-point signal, but also on the superimposed parasitic oscillations.

Figure 2A:
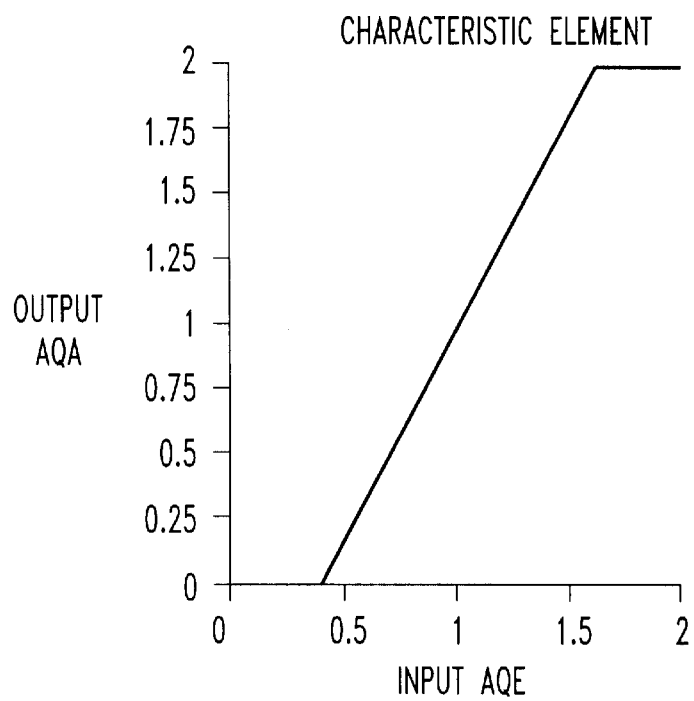
FIG. 2a shows a weighting function of the characteristic element.
Figure 2B:
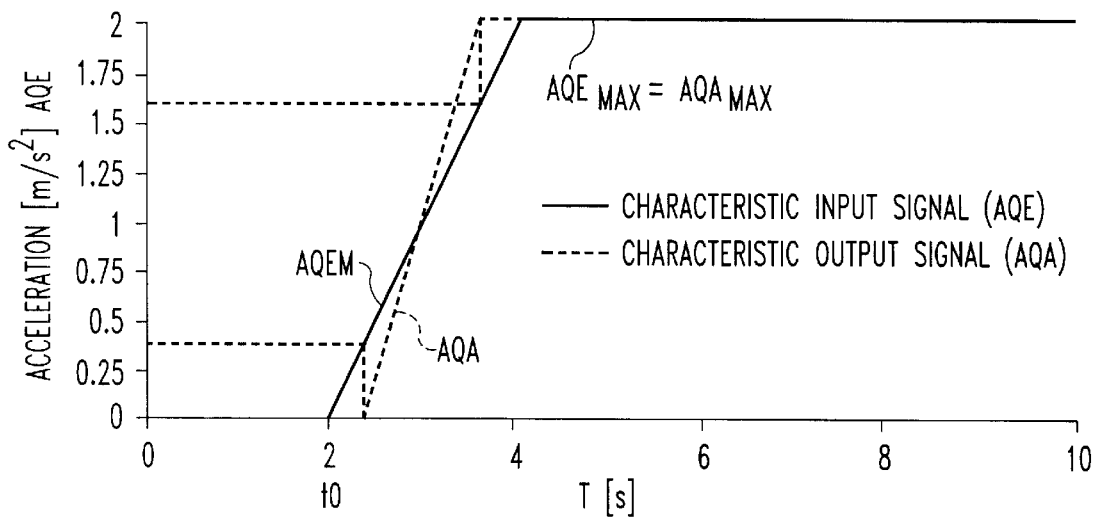
FIG. 2b is a curve of the time slope of the lateral acceleration at track level when entering into a curve.

FIG. 2b illustrates the time slope of the quasi-static lateral acceleration at track level aqe when entering into a curve by an unbroken line. This acceleration signal rises from the entry of the vehicle into the initial transition curve of a track linearly from 0 m/s² at the time t0 (here assumed to be second 2) in a middle section aqem, remaining constant in the curve proper up to a maximum permissible value of 2 m/s². Weighting with the characteristic element 2 according to FIG. 2a results in the output signal curve aqa illustrated by a broken line in FIG. 2b. This represents a converted acceleration value including a basic value for the tilt angle. This output signal aqa remains at zero until the input signal exceeds the value of 0.4 m/s². Its maximum value for vehicle body tilt is, however, already reached at an input signal of 1.6 m/s². This curve section aqa may optionally be made up of several curve segments. The output signal aqa generated in this way therefore reaches its maximum value before entry into the curve proper, in which acceleration at track level aqe remains constant, reaching 2 m/s² in the present case. From 1.6 m/s², there is no further controlled tilt of the vehicle body, so that track level acceleration values above 1.6 m/s² result in a noticeable increase in lateral acceleration in the vehicle body (FIG. 3).

FIG. 2a shows a weighting function in the characteristic element 2. The initial range (no output signal) here extends from 0 m/s² to 0.4 m/s². In the range of 0.4 m/s² to 1.6 m/s², the linear rise is so chosen that the output signal aqa relevant for tilt control corresponds to acceleration values between 0 m/s² and 2 m/s². In the next and final range aqemax of the input signal aqe for track level acceleration values above 1.6 m/s², the output signal aqa relevant for tilt control remains constant and independent of the input signal, corresponding to 2 m/s².

Figure 2C:
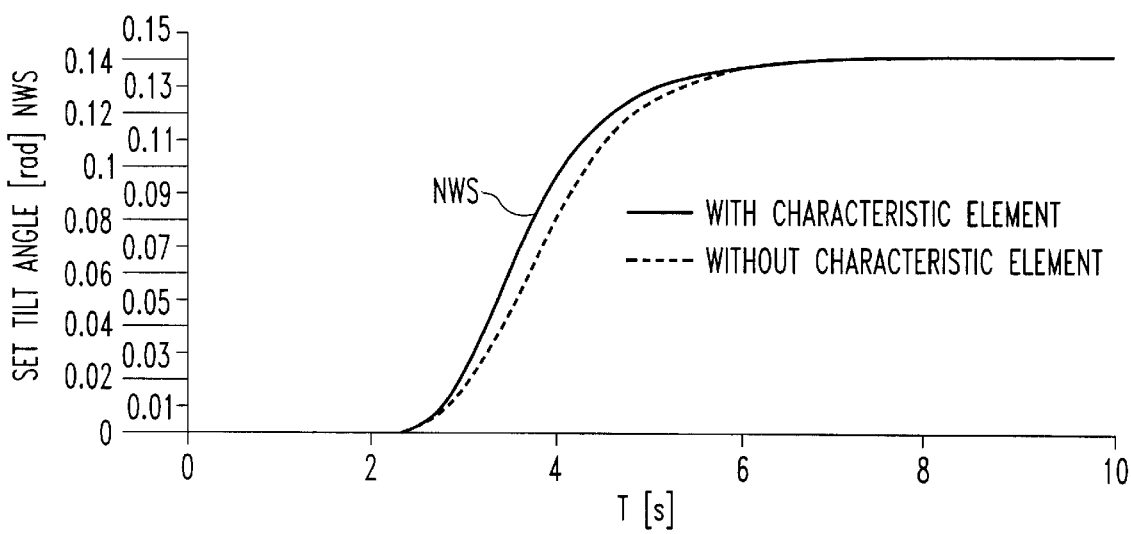
FIG. 2c is a curve of the time slope of the set tilt angle with and without characteristic element.

The output signal aqa of the characteristic element 2 is fed to a low-pass filter 3, the filter output signal nws indicated by an unbroken line in FIG. 2c is generated, which corresponds to the set tilt angle about which the vehicle body negotiating a curve is actually tilted by the associated tilt control device in dependence on the prevailing lateral acceleration in the range between 0.4 and 1.6 m/s². The broken line in FIG. 2c, on the other hand, indicates the curve of the set tilt angle which would apply to the tilt control of the vehicle body without the use of the characteristic element 2. The use of the characteristic element 2 therefore results in a steeper rise of the set tilt angel nws corresponding to the output signal aqa in the middle ramp section of the input signal aqe between the selectable values of 0.4 m/s² and 1.6 m/s². This means a time lead of the set tilt angle signal nws.

Figure 3:
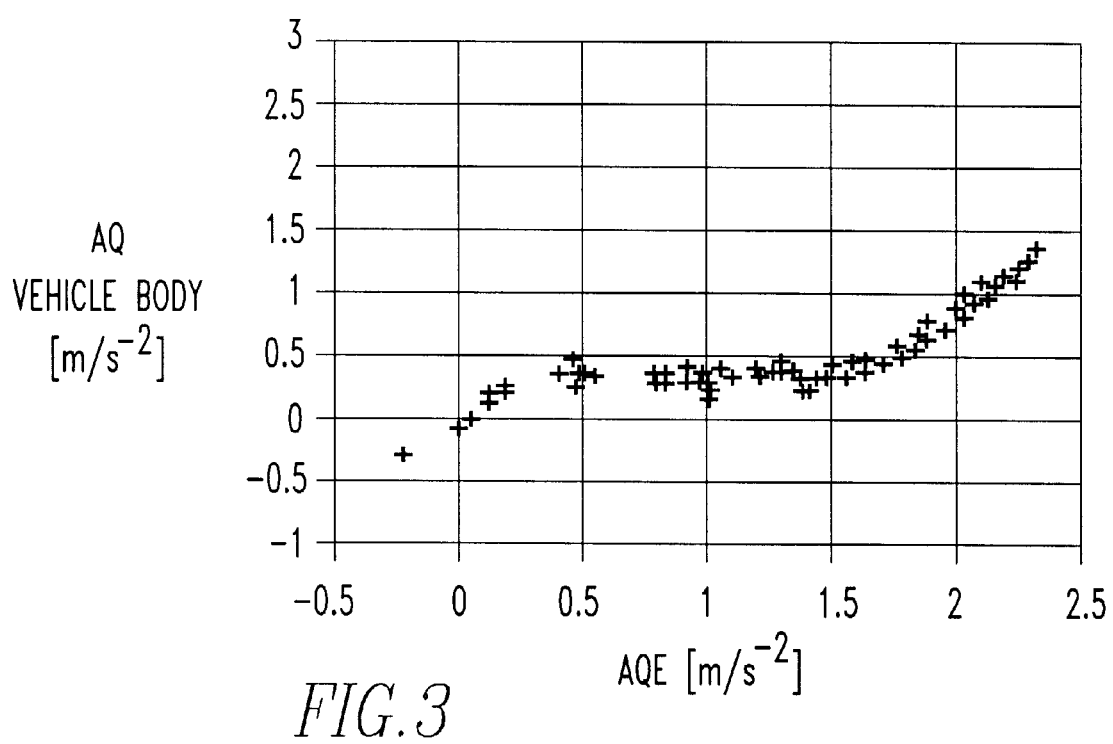
FIG. 3 is a measured curve of the lateral acceleration detectable in the vehicle body.

FIG. 3 illustrates values measured at a trial run of a rail vehicle equipped with a tilt control system according to the invention. The quasi-static acceleration values measured in the vehicle body are plotted above the quasi-static lateral acceleration values aqe measured at the axle of the running gear or bogie of a rail vehicle (corresponding to lateral acceleration at track level). The curve indicates an initial rise of the acceleration values in the vehicle body negotiating a curve to a value of approximately 0.4 m/s², whereupon the lateral acceleration value in the vehicle body remains approximately constant up to bogie acceleration values of approximately 1.6 m/s² owing to the active tilt control of the vehicle body, finally rising continuously with increasing lateral acceleration aqe. In the curve, the passenger therefore feels—consistent with optical impressions—that a curve is in fact being negotiated, without experiencing the actual centrifugal forces in full.

| Vocabulary for figures | |
| --- | --- |
| Sensor | sensor |
| Kennlinie | characteristic |
| Filter | filter |
| Regler | regulator |
| Steuerglieder | control elements |
| Ausgang | output |
| Kennlinienglied | characteristic element |
| Eingang | input |
| Beschleunigung | acceleration |
| Kennl inien-Eingangssignal | characteristic input signal |
| Kennlinien-Ausgangssignal | characteristic output signal |
| Sollneigewinkel | set tilt angle |
| mit Kennlinienglied | with characteristic element |
| ohne Kennlinienglied | without characteristic element |
| Wagenk. | vehicle body |

What is claimed is:

1. A tilt control system for a body of a rail vehicle, comprising:

a lateral acceleration sensor and a tilt control device controlled by the lateral acceleration sensor for tilting the body about its longitudinal axis relative to at least one of a running gear and a bogie carrying the body, and the system further including a low-pass filter installed in a signal path between the lateral acceleration sensor and the tilt control device, wherein a characteristic element is installed in the signal path between the lateral acceleration sensor and the low-pass filter, wherein an output signal of the lateral acceleration sensor is fed to the characteristic element to generate an output signal of the characteristic element, and the output signal of the characteristic element is selected to keep lateral acceleration in the body approximately constant for a section in question, in which for a lower section of the output signal of the lateral acceleration sensor, no output signal of the characteristic element is generated, for a middle section of the output signal of the lateral acceleration sensor, the output signal of the characteristic element has a minimum value and a maximum value and is dependent on the output signal of the lateral acceleration sensor, and for an upper section of the output signal of the lateral acceleration sensor, the output signal of the characteristic element is the maximum value of the output signal of the characteristic element for the middle section of the output signal of the lateral acceleration.

2. The tilt control system according to claim 1 wherein the middle section for the lateral acceleration values prevailing at track level lies between approximately 0.4 and 1.6 m/s$^2$.

3. The tilt control system according to claim 2, wherein the tilt control device tilts the vehicle body at lateral acceleration values between 0.4 m/s$^2$ and 1.6 m/s$^2$, only far enough to maintain a lateral acceleration of approximately 0.4 m/s$^2$ in the vehicle body.

4. The tilt control system according to claim 2, wherein several characteristics are stored in the characteristic element for optional call-up.

5. The tilt control system according to claim 2, wherein the cutoff frequency of the low-pass filter is less than 1 Hz.

6. The tilt control system according to claim 2, wherein the cutoff frequency of the low-pass filter is approximately 0.2 Hz.

7. The tilt control system according to claim 1, wherein the tilt control device tilts the body at lateral acceleration values between 0.4 m/s$^2$ and 1.6 m/s$^2$, only far enough to maintain the lateral acceleration of approximately 0.4 m/s$^2$ in the body.

8. The tilt control system according to claim 7, wherein several characteristics are stored in the characteristic element for optional call-up.

9. The tilt control system according to claim 7, wherein the cutoff frequency of the low-pass filter is less than 1 Hz.

10. The tilt control system according to claim 7, wherein the cutoff frequency of the low-pass filter is approximately 0.2 Hz.

11. The tilt control system according to claim 1, wherein several characteristics are stored in the characteristic element for optional call-up.

12. The tilt control system according to claim 11, wherein the cutoff frequency of the low-pass filter is less than 1 Hz.

13. The tilt control system according to claim 11, wherein the cutoff frequency of the low-pass filter is approximately 0.2 Hz.

14. The tilt control system according to claim 1, wherein a cutoff frequency of the low-pass filter is less than 1 Hz.

15. The tilt control system according to claim 14, wherein the cutoff frequency of the low-pass filter is approximately 0.2 Hz.

16. The tilt control system according to claim 1, wherein the cutoff frequency of the low-pass filter is approximately 0.2 Hz.

17. A method for the implementation of a tilt control system having a lateral acceleration sensor and a tilt control device controlled by the lateral acceleration sensor for tilting the body about its longitudinal axis relative to at least one of a running gear and a bogie carrying the body, and the system further including a low-pass filter installed in a signal path between the lateral acceleration sensor and the tilt control device, wherein a characteristic element is installed in the signal path between the lateral acceleration sensor and the low-pass filter, wherein an output signal of the lateral acceleration sensor is fed to the characteristic element to generate an output signal of the characteristic element, and the output signal of the characteristic element is selected to keep lateral acceleration in the body approximately constant for a section in question, comprising the steps of:

generating no output signal of the characteristic element for a lower section of the output signal of the lateral acceleration sensor, generating the output signal of the characteristic element which has a minimum value and a maximum value and is dependent on the output signal of the lateral acceleration sensor for a middle section of the output signal of the lateral acceleration sensor, and generating the output signal of the characteristic element which is the maximum value of the output signal of the characeristic element for the middle section of the output signal of the lateral acceleration for an upper section of the output signal of the lateral acceleration sensor.

18. The method according to claim 17, wherein the middle section of the output signal of the lateral acceleration sensor is between about 0.4 m/s$^2$ to 1.6 m/s$^2$.

* * * * *

UNITED STATES PATENT AND TRADEMARK OFFICE
CERTIFICATE OF CORRECTION

PATENT NO. : 6,273,003 B1 Page 1 of 1
DATED : August 14, 2001
INVENTOR(S) : Thomas Benker et al.

It is certified that error appears in the above-identified patent and that said Letters Patent is hereby corrected as shown below:

Column 3,
Line 57, "a low-pass filter 3, the" should read -- a low-pass filter 3. Owing to the contouring error or delay of the low-pass filter 3, the --.

Column 4,
Line 32, "Kennl inien-" should read -- Kennlinien --.

Signed and Sealed this

Eleventh Day of June, 2002

*Attest:*

JAMES E. ROGAN
*Attesting Officer*     *Director of the United States Patent and Trademark Office*